United States Patent [19]

Kumazawa

[11] Patent Number: 4,736,809

[45] Date of Patent: Apr. 12, 1988

[54] VEHICULAR INTERNAL COMBUSTION ENGINE WITH SUBSIDIARY TRANSMISSION

[75] Inventor: Toshiharu Kumazawa, Iwata, Japan

[73] Assignee: Yamaha Hatsudoki Kabushiki Kaisha, Japan

[21] Appl. No.: 754,825

[22] Filed: Jul. 12, 1985

[30] Foreign Application Priority Data

Jul. 13, 1984 [JP] Japan ................................ 59-144337

[51] Int. Cl.⁴ ................................................ B60K 17/06

[52] U.S. Cl. ...................................... 180/75.1; 74/467; 180/70.1; 180/292; 184/1.5

[58] Field of Search ......................... 74/745, 467, 740; 180/70.1, 71, 292, 75.1; 184/1.5

[56] References Cited

U.S. PATENT DOCUMENTS

| | | | |
|---|---|---|---|
| 4,082,156 | 4/1978 | Krolak et al. | 180/70.1 |
| 4,145,883 | 3/1979 | Forster et al. | 180/70.1 |
| 4,170,273 | 10/1979 | Kodama et al. | 180/70.1 |
| 4,203,498 | 5/1980 | Kodama | 180/75.1 |
| 4,373,601 | 2/1983 | Onda et al. | 180/75.1 |
| 4,574,910 | 3/1986 | Miki et al. | 180/75.1 |

FOREIGN PATENT DOCUMENTS 59-69552 4/1984 Japan .

*Primary Examiner*—Richard A. Bertsch
*Attorney, Agent, or Firm*—Ernest A. Beutler

[57] ABSTRACT

An off the road vehicle embodying an improved power unit having a compact transmission assembly comprising a main transmission and an auxiliary transmission. The transmissions are separated by a common partition wall of a major casting of the engine and the change speed transmission are contained within respective cavities formed by the partition and covers affixed to opposite sides of the partition. An improved arrangement is provided for lubricating the auxiliary transmission from the main transmission and for returning the lubricant from the auxiliary transmission to the main transmission. The return is designed so as to maintain a higher level of lubricant in the auxiliary transmission when the engine is running than when it is not running so as to insure good lubrication during running and good drainage when the engine is not running.

17 Claims, 5 Drawing Sheets

VEHICULAR INTERNAL COMBUSTION ENGINE WITH SUBSIDIARY TRANSMISSION

BACKGROUND OF THE INVENTION

This invention relates to a vehicular internal combustion engine with a subsidiary transmission and more particularly to an improved engine, transmission construction and an improved method for lubricating a transmission.

A type of vehicle that is currently enjoying great popularity is the balloon tired off the road vehicle designed to handle primarily a single rider. These vehicles may have either two, three or four wheels and are generally powered by a motorcycle type power plant that includes an engine and a change speed transmission within the crankcase of the engine. However, such driving arrangements do not offer sufficient numbers of forward gears for off the road use and, furthermore, such transmissions do not normally include a reverse. Therefore, it has been the practice to mount an auxiliary transmission at one side of the crankcase which auxiliary transmission contains additional forward gears and/or a reverse gear. However, the engine and transmission assembly is normally positioned between the rider's legs and the addition of a further transmission to one side of the crankcase can significantly and undesirably increase the width of the power plant and make the riding position uncomfortable.

It is, therefore, a principal object of this invention to provide an improved and compact transmission arrangement for an off the road vehicle.

It is a further object of this invention to provide an improved and compact auxiliary transmission in combination with an engine crankcase positioned primary transmission.

It is a still further object of this invention to provide a compact power unit for a vehicle.

When using an auxiliary transmission of the type as aforenoted, it is desirable to insure that the auxiliary transmission is adequately lubricated. This is particularly true if the auxiliary transmission also includes a final drive for driving a drive shaft to power the vehicle. Although such lubrication can be provided by incorporating a separate lubricant reservoir in the auxiliary transmission, this further adds to the amount of lubricant required for the complete system and adds to the servicing required for the vehicle.

It is, therefore, a still further object of this invention to provide an improved system for lubricating an auxiliary transmission.

It is another object of this invention to provide a lubricating system for an auxiliary transmission that is supplied with lubricant from the primary transmission which drives it.

When an auxiliary transmission is lubricated with the lubricant from the primary transmission, it is desirable if the entire lubricant can be drained by merely draining the primary transmission. However, it is also desirable to maintain a certain predetermined level of lubricant in the auxiliary transmission during running so as to insure that its gears will be properly lubricated. With prior art constructions, it has not been possible to achieve both of these ends.

It is, therefore, a further object of this invention to provide an improved lubricant system for an auxiliary transmission.

It is another object of this invention to provide a lubricant system of an auxiliary transmission wherein the lubricant level is maintained at a high level during running and at a substantially lower level with the transmission is not being driven.

SUMMARY OF THE INVENTION

A first feature of the invention is adapted to be embodied in a combined crankcase, transmission assembly for a vehicle comprising a casing having a partition that extends generally longitudinally relative to the associated vehicle. A first cover is affixed to the partition at one side thereof and with the partition defines a first cavity in which a first change speed transmission is incorporated. The first change speed transmission has an input shaft that is driven by an engine output shaft journaled at least in part by the casing and an output shaft that is driven by the input shaft. A second cover is fixed to the partition at the other side and defines with the partition a second cavity that contains a second change speed transmission. The second change speed transmission includes an input shaft and an output shaft driven by the input shaft. Means are provided that extend through the partition for driving the input shaft of the second change speed transmission from the output shaft of the first change speed transmission.

Another feature of the invention is adapted to be embodied in a lubricating system for an auxiliary transmission that has an input shaft driven by a main transmission. A secondary shaft is driven by the input shaft and final drive means for driving an output for powering a vehicle or the like is driven from the secondary shaft. The input shaft and the secondary shaft each have respective lubricant passages extending at least partially therethrough. Means are provided for delivering lubricant to the input shaft from externally of the auxiliary transmission and conduit means deliver lubricant from the lubricant passage of the input shaft to the lubricant passage of the secondary shaft. Means are provided for delivering lubricant from the secondary shaft lubricant passage to the final drive.

Yet a further feature of the invention is adapted to be embodied in a lubricating system for an auxiliary transmission having an input shaft and an output shaft and change speed gears for driving the output shaft from the input shaft. In accordance with this feature of the invention, the auxiliary transmission has a casing and lubricant is delivered to the casing from externally of the casing during driving of the input shaft. Lubricant drain means are incorporated for draining lubricant from the casing back externally of the casing and for providing lubricant at a first level within the casing when the input shaft is being driven and at a second, substantially lower level when the input shaft is not being driven.

DETAILED DESCRIPTION OF THE PREFERRED EMBODIMENT

Figure 1:
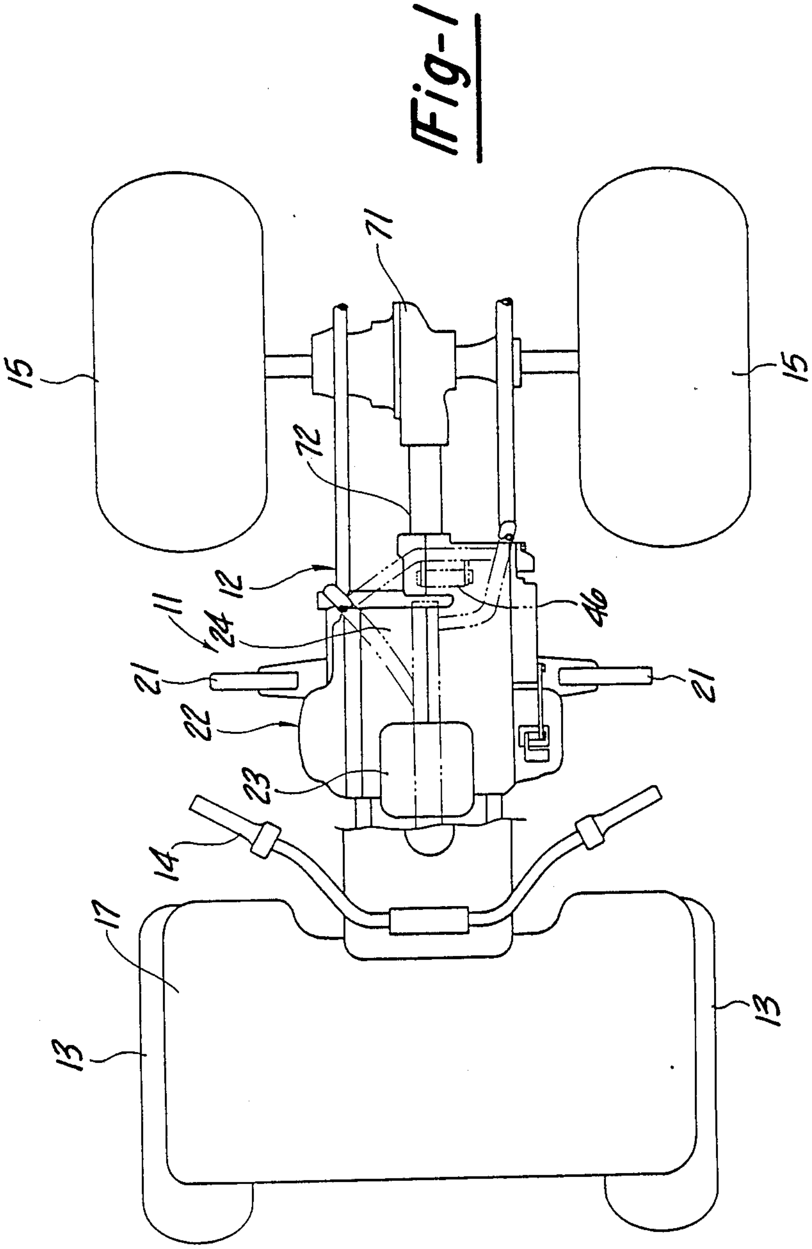
FIG. 1 is a top plan view of an off the road vehicle constructed in accordance with an embodiment of the invention.
Figure 2:
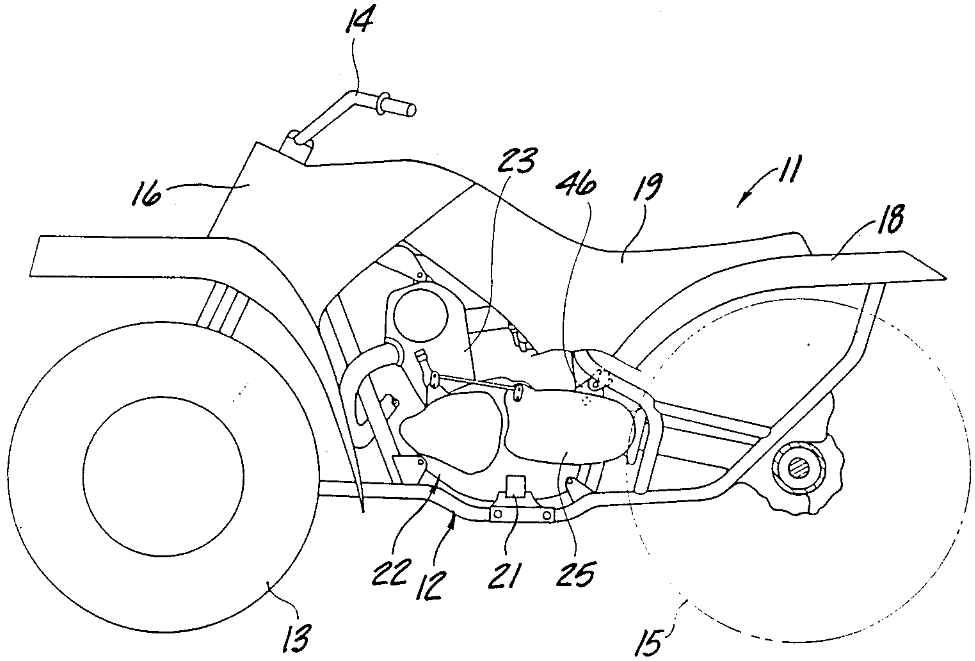
FIG. 2 is a side elevational view of the vehicle.

Referring first primarily to FIGS. 1 and 2, an off the road vehicle having a power unit constructed in accordance with an embodiment of the invention is identified generally by the reference numeral 11. Although the invention is described in conjunction with such an off the road vehicle, it is to be understood that certain facets of the invention may be used with other types of vehicles or, in fact, in other transmission mechanisms.

The vehicle 11 includes a frame assembly, indicated generally by the reference numeral 12 that dirigibly supports a pair of front wheels 13 carrying balloon tires. The front wheels 13 are steered by means of a handlebar assembly 14 in a known manner. In addition, a pair of rear wheels mounting balloon tires 15 are supported at the rear end of the frame and driven in a manner to be described. The balloon tires on the front and rear wheels 13 and 15 are of the large, low pressure type which are normally inflated to a pressure in the range of 0.1 to 0.3 $Kg/cm^2$.

A body is mounted on the frame 12 that includes a front cowling 16, a front fender assembly 17 and a rear fender assembly 18. A seat 19 is provided that is adapted to accommodate a single rider. A pair of foot pegs 21 are carried by the frame 12 in a position to accommodate the feet of a rider seated on the seat 19.

A power unit, indicated generally by the reference numeral 22, is supported within the frame 12 in underlying relationship to the seat 19. The power unit 22 includes an internal combustion engine 23 which, in the illustrated embodiment, is a single cylinder, reciprocating type engine having a crankshaft. The crankshaft is supported within a combined crankcase and transmission casing 24. A primary transmission, to be described, is contained within the casing 24 and is contained in a manner to be described. In addition, an auxiliary transmission 25 is driven by the primary transmission for powering the rear wheels 15 in a manner to be described.

Referring now additionally to the remaining figures, the power unit 22 includes a main casing, indicated generally by the reference numeral 26, which may be formed conveniently as a casting. The main casing 26 defines a crankcase chamber 27 in which a crankshaft 28 of the engine is rotatably journaled. The crankshaft 28 is journaled at least in part by the casing 26 and has affixed to it at one side of the crankcase chamber 27 a generator or alternator 29. The alternator 29 is enclosed by means of a cover plate 31 that defines an additional cavity in which a recoil starter 32 is contained for pull starting of the engine 23. Because the alternator 29 is contained, it will not be damaged by mud or foreign matter that will be encountered with the normal off the road use of the vehicle.

At the other side of the crankcase chamber 29, a centrifugal clutch 33 is affixed to the crankshaft 28 and drives a driven gear 34 when the speed of rotation of the crankshaft 28 exceeds the speed at which the centrifugal clutch engages.

A multiple disk clutch 35 is provided with an input gear 36 which is enmeshed with the gear 34 and which clutch, when engaged, is adapted to drive an input shaft 37 of a primary transmission, indicated generally by the reference numeral 38. The primary transmission 38 is contained within the casing 26 and specifically within a cavity 39 that is formed by a rearwardly extending, generally centrally disposed partition 41 of the casing 26 and a cover plate 42 that is affixed in any suitable manner to the partition 41. A further cover assembly 43 is affixed to the cover plate 42 and encloses the clutches 33 and 35 and the gears 34 and 36.

The primary change speed transmission 38 includes a secondary shaft 44 that carries a number of gears and dog clutches which cooperate with suitable gears and dog clutches 45 carried by the primary shaft 37 for providing a plurality of selected forward speed ratios. The dog clutches 45 are operated by a rotary type cam as is well known in this art and which, for that reason, has not been illustrated.

It should be noted that the primary and second shafts 37 and 44 of the primary transmission 45 are rotatably journaled in the cover plate 42 and the partition 41.

The partition 41 is formed with an upwardly extending boss 46 that affords a means of attachment to the frame 12 so as to suspend the rear portion of the power unit 22.

The side of the partition 41 opposite to the cavity 39 is formed with a second cavity 47 that is covered by the secondary transmission cover plate 25 and which houses a secondary or auxiliary transmission assembly, indicated generally by the reference numeral 48. The auxiliary transmission 48 includes an input shaft which constitutes an extension of the primary transmission secondary or output shaft 44 that extends through an opening in the partition 41 and which is journaled therein. The outer end of the shaft 44 is journaled in the cover plate 25 by means of an anti-friction bearing 49. A pair of gears 51 and 52 are journaled on the opposite ends of the portion of the shaft 44 that extends within the cavity 47. A dog clutching element 53 is splined to the shaft 44 between the gears 51 and 52. The dog clutching element 53 is axially movable so as to rotatably couple either the gear 51 or the gear 52 for rotation with the shaft 44. In addition, the dog clutching element 53 has a position wherein neither of the gears 51 or 52 are clutched for rotation to the shaft 44 for a reason to be described.

A secondary or idler shaft 54 is rotatably journaled within the cavity 47 by anti-friction bearings carried by the partition 41 and the cover plate 25. Non-rotatably affixed to the secondary shaft 54 is a first gear 55 that is in constant mesh with the input shaft gear 51 and a second gear 56 that is in constant mesh with the gear 52. The ratio between the gear sets 51 and 55 and 52 and 56 is different from each other with the gear set 51, 55 providing the higher ratio. Hence, when the dog clutch 53 clutches the gear 51 for rotation with the shaft 44, the shaft 54 will be driven at the high speed while it will be driven at a low speed when the dog clutch 53 clutches the gear 52 to the shaft 44.

The gear 55 is also enmeshed with a gear 57 that is non-rotatably fixed to an output shaft 58 which is also journaled in the partition 41 and the cover plate 25. The output shaft 58 has affixed to it a bevel gear 59. The bevel gear 59 is provided within a final drive cavity 61 that is formed by the partition 41. Within this cavity, there is provided a further bevel gear 62 that is enmeshed with the bevel gear 59 and which is rotatably journaled on an output shaft 63. An overlaod release coupling 64 rotatably couples the driven bevel gear 62 with the output shaft 63. The overload release coupling 64 will discontinue the driving relationship between the bevel gear 62 and the output shaft 63 in the event an obstacle is struck or there is too great a resistance to turning of the rear wheels 15.

The output shaft 63 is journaled in a cover plate 65 by means of anti-friction bearing 66. The bearing 66 is axially affixed on the output shaft 63 by means of a press fitted sleeve 67. Because of the use of the press fitted sleeve 67 rather than the normal threaded connection, the shaft 63 may be made of a smaller diameter and the bearing 66 may be made smaller.

The output shaft 63 is coupled to a drive shaft 68 by means of a coupling member 69 so as to drive the drive shaft 68. The drive shaft 68 drives the rear wheels 15 by means including a final drive 71 (FIG. 1). In addition, the drive shaft 68 is contained within a cylindrical protective housing 72.

The auxiliary transmission 48 also provides a reverse gear for driving the drive shaft 68 in reverse and this includes a reverse gear shaft 73 that is also journaled at its opposite ends by the partition 41 and cover 25. The reverse gear shaft 73 carries a first gear 74 that is adapted to engage with a gear 75 formed integrally with and externally of the dog clutching element 53. The reverse gear 74 is rotatably journaled on the reverse gear shaft 73 and is adapted to be clutched for simultaneous rotation with this shaft by a dog clutching element 76. It should be noted that the gear 75 meshes with the gear 74 when the dog clutching element 53 is in its neutral position.

Figure 5:
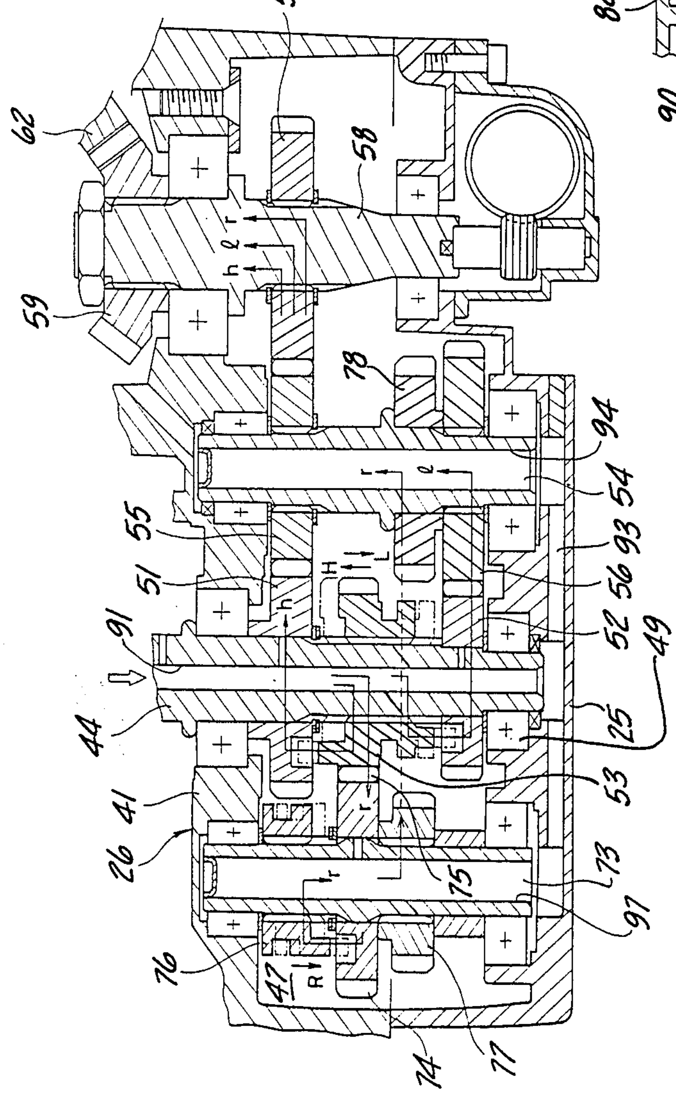
FIG. 5 is an enlarged view showing the layout of the gear sets in the auxiliary transmission.

A gear 77 is affixed for rotation with the reverse gear shaft 73 and is enmeshed a gear 78 that is affixed to the gear 56 and rotates with it and with the idler shaft 54. Hence, when the dog clutching element 53 is in its neutral position and the dog clutching element 76 is engaged, the shaft 54 will be driven in a reverse direction. The various driving relations high, low and reverse are indicated in FIG. 5 by the lines h, l and r.

Figure 3:
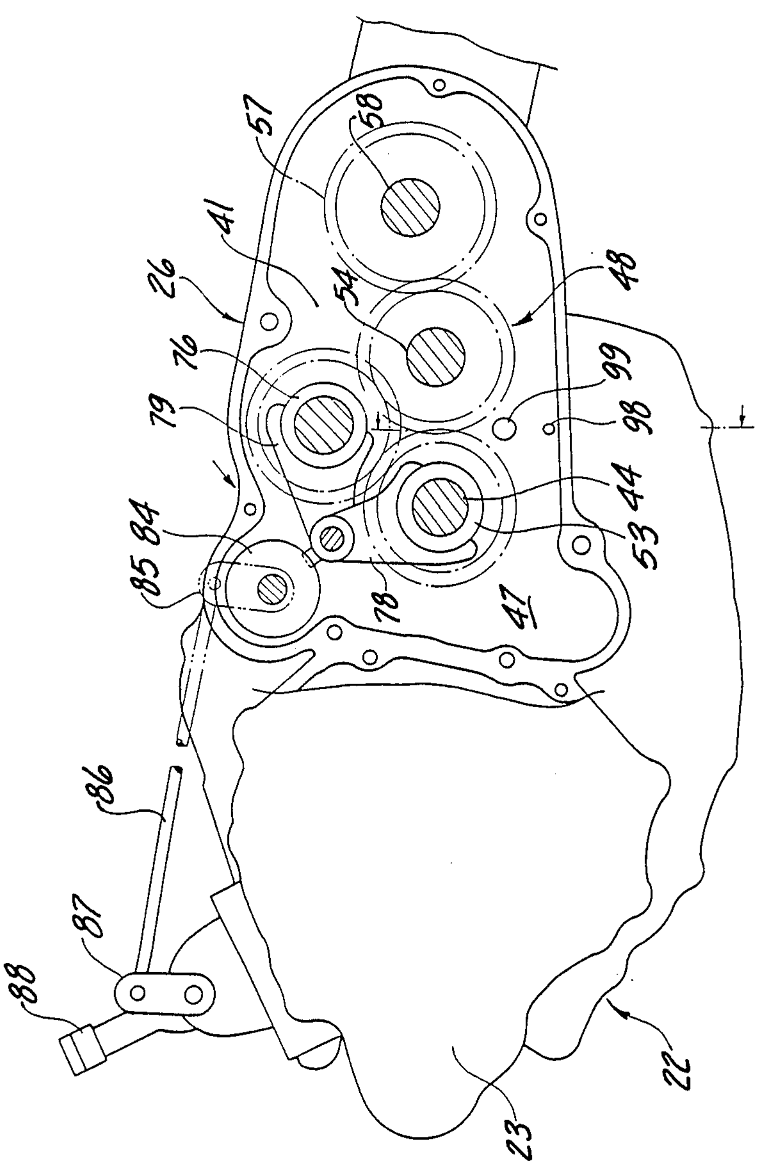
FIG. 3 is an enlarged side elevational view showing the transmission mechanism with the cover plate removed.
Figure 4:
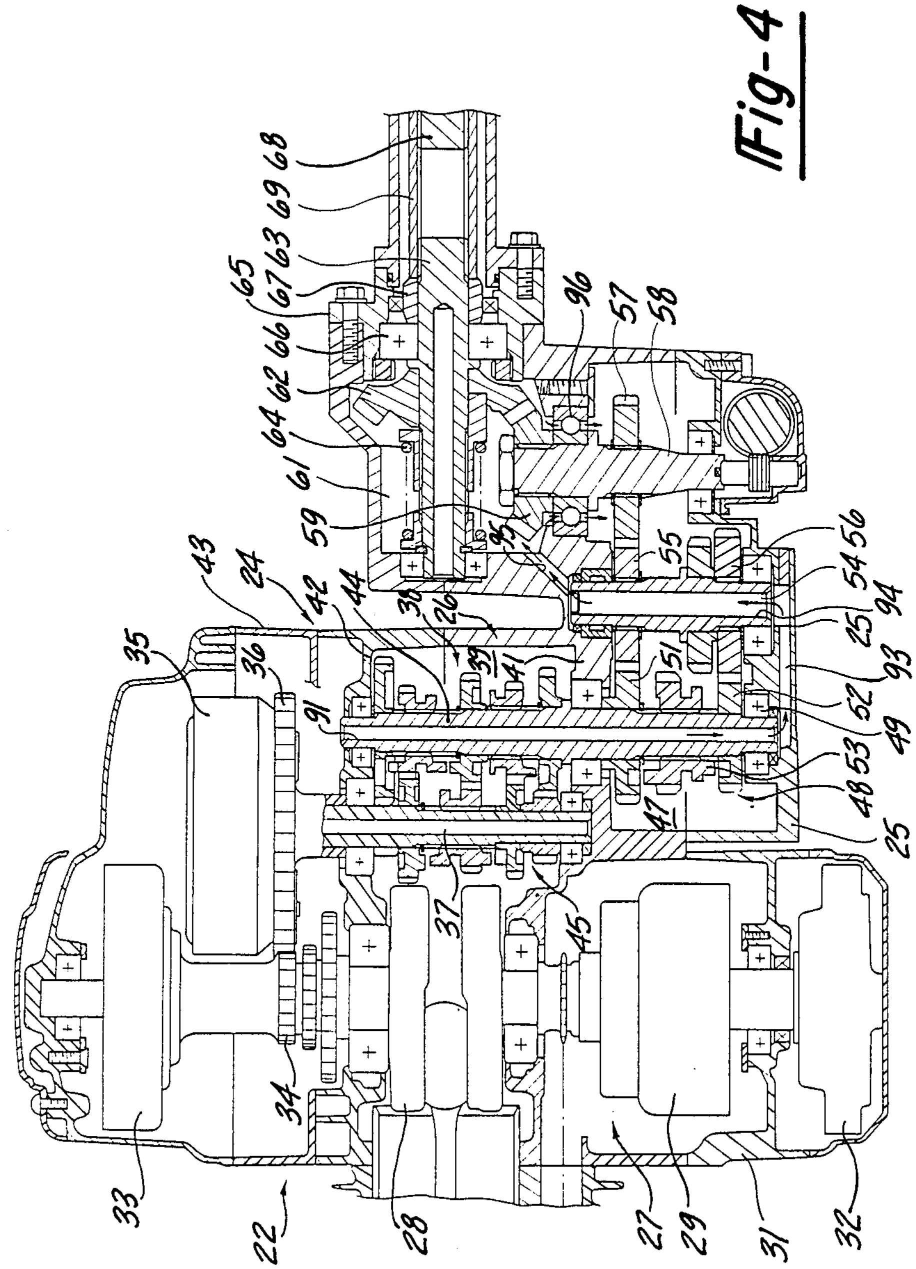
FIG. 4 is a horizontal cross-sectional view taken through the transmission and crankcase assembly of the vehicle.
Figure 6:
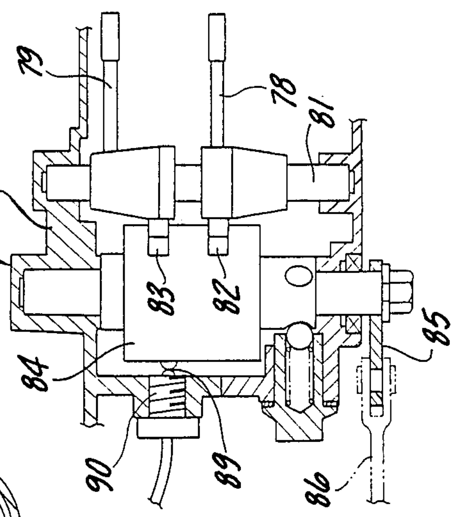
FIG. 6 is a cross-sectional view showing the shifting mechanism for the auxiliary transmission.

The mechanism for shifting the dog clutches 76 and 53 of the auxiliary transmission 48 may be best understood by reference to FIGS. 3 and 6. A first shifting fork 78 is associated with the dog clutch 53 and a second shifting fork 79 is associated with the dog clutch 76. The shifting forks 78 and 79 are slidably supported on a shaft 81 and have respective lugs 82 and 83 that are engaged in grooves in a rotary shifting cam 84. The shifting cam 84 has its grooves shaped so that when it rotates in one direction or another, either the fork 78 or the fork 79 will be slid axially so as to provide the desired engagement.

A lever 85 is affixed to the exposed end of the shaft which supports the shifting cam 84 and has one end of a link 86 connected to it. The opposite end of the link 86 is connected to a further lever 87 that is mounted in proximity to a convenient location for access by the operator and this link is rotated by an operator controlled shift lever 88 so as to shift into the desired transmission ratio.

The shifting cam 84 has a projection 89 that is adapted to cooperate with a switch 90 so as to provide an electrical signal when the auxiliary transmission is shifted into reverse. This signal may be transmitted to a light carried by the handlebars 14 so as to give the operator a visual warning when the auxiliary transmission is in reverse.

An arrangement is incorporated for lubricating the auxiliary transmission 48 from the lubricant utilized to lubricant the primary transmission 38. To this end, the primary transmission shaft 44 is provided with an axially extending lubricant passage 91 that extends completely through this shaft. Lubricant is delivered to the end of this shaft that is positioned in the crankcase 27 by a suitable pump (not shown). This lubricant flows axially through the shaft 44 and may be discharged through one or more radial passages for lubricating the individual gears and sliding dog clutch elements. In addition, a passage 93 is formed in the cover 25 so as to deliver lubricant to a passage 94 formed in the idler shaft 54. This passage 94 extends completely through the shaft 54 and terminates at a passage 95 that extends through the partition 26 into the cavity 61 in proximity to the bevel gear 59 for delivering lubricant to the final drive. This lubricant can then flow back through an anti-friction bearing 96 that journals the shaft 58 and accumulate in the chamber 47. In addition, the cover plate passage 93 registers with a passage 97 that extends through the reverse gear shaft 73 which shaft may be cross-drilled so as to lubricate the elements associated with it.

Figure 7:
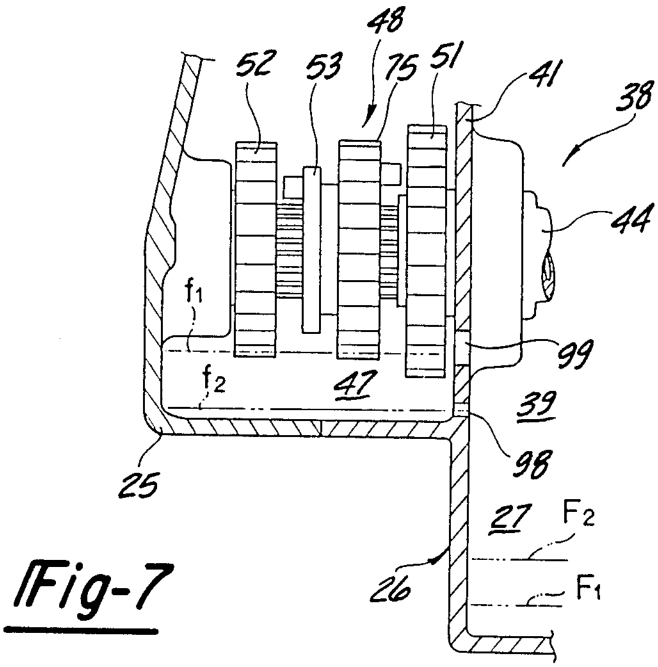
FIG. 7 is a cross-sectional view taken along the line 7—7 of FIG. 3.

The lubricant which has been delivered through the shaft passages 91, 94 and 97 is accumulated in the cavity 47 and then drained back to the crankcase 27. For this purpose, there are provided a pair of drain holes, a first small drain hole 98 that is positioned at the bottom of the cavity 47 and a second, larger drain hole 99 that is positioned vertically above the hole 98. The effect of this drain arrangement may be best understood by reference to FIG. 7. The smaller drain hole 98 is sized so that it is not large enough to permit the flow by gravity back to the crankcase 27 of the full amount of oil delivered by the lubricant pump to the auxiliary transmission cavity 47 when the engine is operating. Thus, oil will accumulate to the level $f_1$ in the auxiliary transmission cavity 47 under this condition. The hole 99 is sufficiently large so as to permit return flow of any oil that is in excess above the line $f_1$ regardless of the speed of operation of the pump. At the same time, the level of lubricant in the crankcase 27 will fall to the level $f_1$. However, when the engine is stopped, the oil can completely drain out of the auxiliary transmission cavity 47 through the hole 98 over a period of time and the level of the oil will then be at the point $f_2$. In the main crankcase 27, however, the oil will reach the level $F_2$. In this way, the total amount of oil needed for the system can be reduced and good lubrication will be insured of both transmissions when the engine is running.

It should be readily apparent that there has been disclosed a very effective and compact transmission arrangement for vehicles that includes an auxiliary transmission and which insures good lubrication under all conditions. Although an embodiment of the invention has been illustrated and described, various changes and modifications may be made without departing from the spirit and scope of the invention, as defined by the appended claims.

I claim:

1. A combined crankcase, transmission assembly for a vehicle comprising a casing having a partition extending generally longitudinally relative to the associated vehicle, a first cover affixed to said partition at one side thereof and defining with said partition a first cavity, a first change speed transmission contained within said first cavity, said first change speed transmission having an input shaft driven by an engine output shaft journaled at least in part by said casing and an output shaft driven by said input shaft, a second cover affixed to said partition on the other side thereof and defining with said partition a second cavity, a second change speed transmission in said second cavity, said change speed transmission comprising an input shaft and an output shaft driven by said input shaft, and means extending through said partition for driving said second change speed transmission input shaft from said first change speed transmission output shaft, said input and output shafts of said first change speed transmission being journaled by said partition and by said first cover and said input and output shafts of said second change speed transmission being journaled by said partition and said second cover, said means for driving said input shaft of said second change speed transmission from said output shaft of said first change speed transmission comprising a single shaft forming the respective input and output shafts.

2. A combined crankcase, transmission assembly for a vehicle comprising a casing having a partition extending generally longitudinally relative to the associated vehicle, a first cover affixed to said partition at one side thereof and defining with said partition a first cavity, a first change speed transmission contained within said first cavity, said first change speed transmission having an input shaft driven by an engine output shaft journaled at least in part by said casing and an output shaft driven by said input shaft, a second cover affixed to said partition on the other side thereof and defining with said partition a second cavity, a second change speed transmission in said second cavity, said change speed transmission comprising an input shaft and an output shaft driven by said input shaft, and means extending through said partition for driving said second change speed transmission input shaft from said first change speed transmission output shaft, said means for driving the output shaft from the input shaft of said first change speed transmission comprises a plurality of meshing gear pairs and dog clutching means for selectively coupling the gears to the respective shafts, said gear pairs all providing a plurality of forward drive ratios, said second change speed transmission providing a reverse drive as well as a forward drive.

3. A combined crankcase, transmission assembly as set forth in claim 2 further including final drive means for driving a drive shaft for powering the vehicle within the second change speed transmission and driven by the output shaft of the second change speed transmission.

4. A combined crankcase, transmission assembly for a vehicle comprising a casing having a partition extending generally longitudinally relative to the associated vehicle, a first cover affixed to said partition at one side thereof and defining with said partition a first cavity, a first change speed transmission contained within said first cavity, said first change speed transmission having an input shaft driven by an engine output shaft journaled at least in part by said casing and an output shaft driven by said input shaft, a second cover affixed to said partition on the other side thereof and defining with said partition a second cavity, a second change speed transmission in said second cavity, said change speed transmission comprising an input shaft and an output shaft driven by said input shaft, and means extending through said partition for driving said second change speed transmission input shaft from said first change speed transmission output shaft, said shafts all rotating about axes that are transversely disposed relative to the partition.

5. A combined crankcase, transmission assembly for a vehicle comprising a casing having a partition extending generally longitudinally relative to the associated vehicle, a first cover affixed to said partition at one side thereof and defining with said partition a first cavity, a first change speed transmission contained within said first cavity, said first change speed transmission having an input shaft driven by an engine output shaft journaled at least in part by said casing and an output shaft driven by said input shaft, a second cover affixed to said partition on the other side thereof and defining with said partition a second cavity, a second change speed transmission in said second cavity, said change speed transmission comprising an input shaft and an output shaft driven by said input shaft, means extending through said partition for driving said second change speed transmission input shaft from said first change speed transmission output shaft, a lubricating passage extending through the input shaft of said second change speed transmission, means for delivering lubricant to said input shaft lubricant passage, a lubricant passage extending through the output shaft of said second change speed transmission, and conduit means for delivering lubricant from the lubricant passage of the input shaft to the lubricant passage of the output shaft.

6. A combined crankcase, transmission assembly as set forth in claim 5 wherein the input and output shaft of the first change speed transmission are journaled by the partition and by the first cover and the input and output shafts of the second change speed transmission are journaled by the partition and the second cover.

7. A combined crankcase, transmission assembly as set forth in claim 6 wherein the conduit means is formed within the second cover.

8. A combined crankcase, transmission assembly as set forth in claim 5 further including drain means for draining lubricant from the second cavity to the first cavity at a first rate when the associated engine is running and at a second slower rate when the engine is not running.

9. A combined crankcase, transmission assembly as set forth in claim 8 wherein the draining means comprises a first larger area hole at a higher level in the partition and a second smaller area hole in the partition at a lower level than the first hole.

10. A lubricating system for an auxiliary transmission having an input shaft driven by a main transmission, a secondary shaft driven by said input shaft, final drive means for driving an output shaft for powering a vehicle or the like, means for driving said final drive from said secondary shaft, said input shaft and said secondary shaft each having a respective lubricant passage extending at least partially therethrough, means for delivering lubricant to said input shaft lubricant passage from externally of said auxiliary transmission, conduit means for delivering lubricant from the lubricant passage of said input shaft to the lubricant passage of said secondary shaft, and means for delivering lubricant from said secondary shaft lubricant passage to said final drive.

11. A lubricating system as set forth in claim 10 wherein the input shaft and the secondary shaft are journaled in a cover plate and the conduit means is formed in the cover plate.

12. A lubricant system as set forth in claim 10 wherein the lubricant is delivered to the input shaft from the main transmission.

13. A lubricant system as set forth in claim 12 wherein the main transmission and the auxiliary transmission are separated by a common wall and further including drain means in the common wall for returning lubricant from the auxiliary transmission to the main transmission.

14. A lubricant system as set forth in claim 13 wherein the drain returns lubricant from the auxiliary transmission to the main transmission at a first greater rate when the associated engine is running and at a second slower rate when the associated engine is not running.

15. A lubricant system as set forth in claim 13 wherein the drain means comprises a first larger effective area opening in the common wall and a second, substantially smaller effective area opening in the wall at a level substantially below the level of the first opening.

16. A drain system for an auxiliary transmission driven by a main transmission and separated therefrom by a common wall comprising drain means for returning lubricant from the auxiliary transmission to the main transmission, said means for returning being effective to provide a higher lubricant level in said auxiliary transmission when the auxiliary transmission is being driven than when the auxiliary transmission is not being driven.

17. A drain system as set forth in claim 16 wherein the drain means comprises a first opening in the common wall of a relatively large effective area and a second substantially smaller effective area opening in the wall below the first opening.

* * * * *